March 30, 1965 L. R. HAGNER ETAL 3,175,673
ARTICLE HANDLING AND ADVANCING MECHANISM
Filed May 28, 1963 5 Sheets-Sheet 1
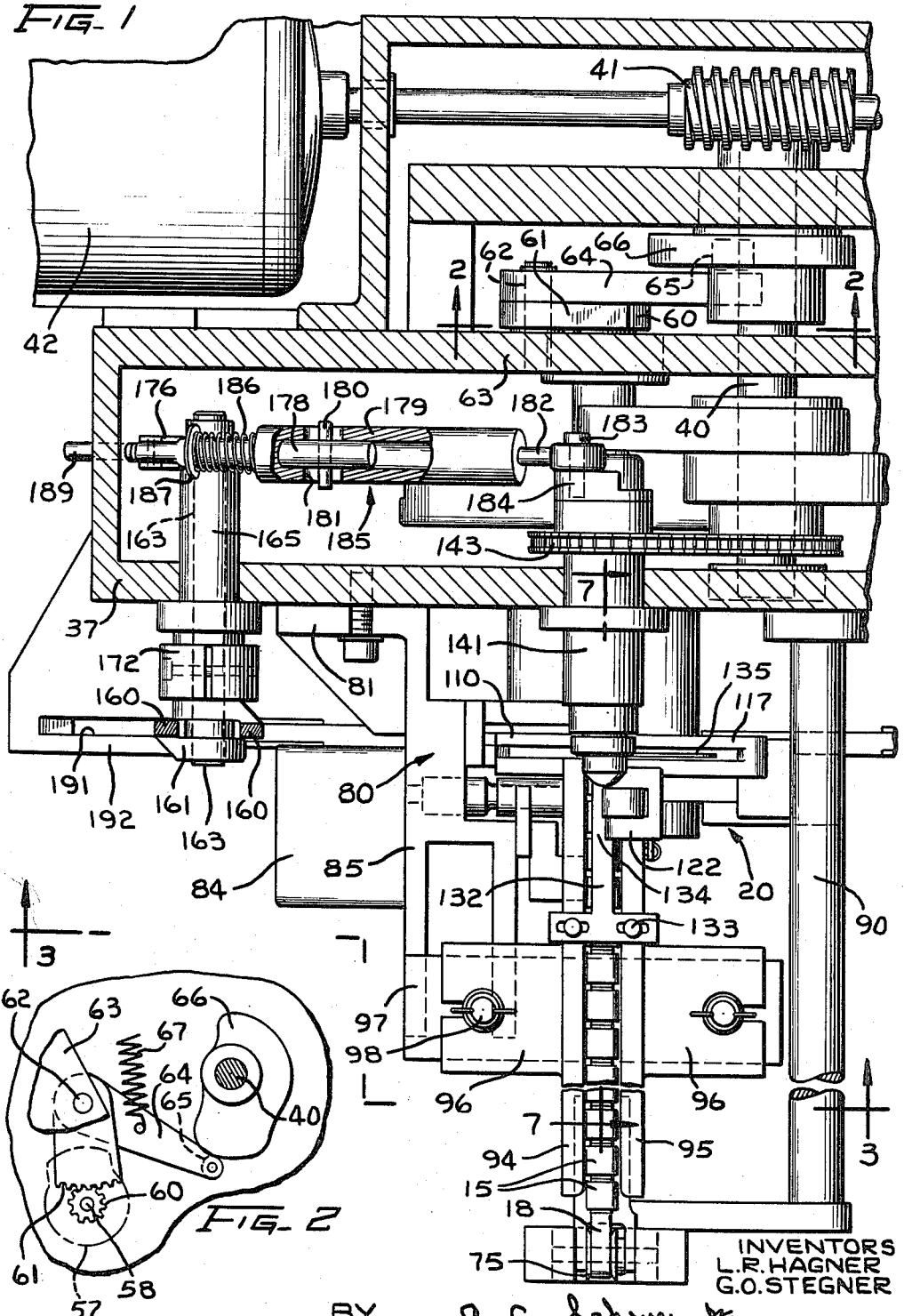
INVENTORS
L. R. HAGNER
G. O. STEGNER
BY A. C. Schway Jr. ATTORNEY

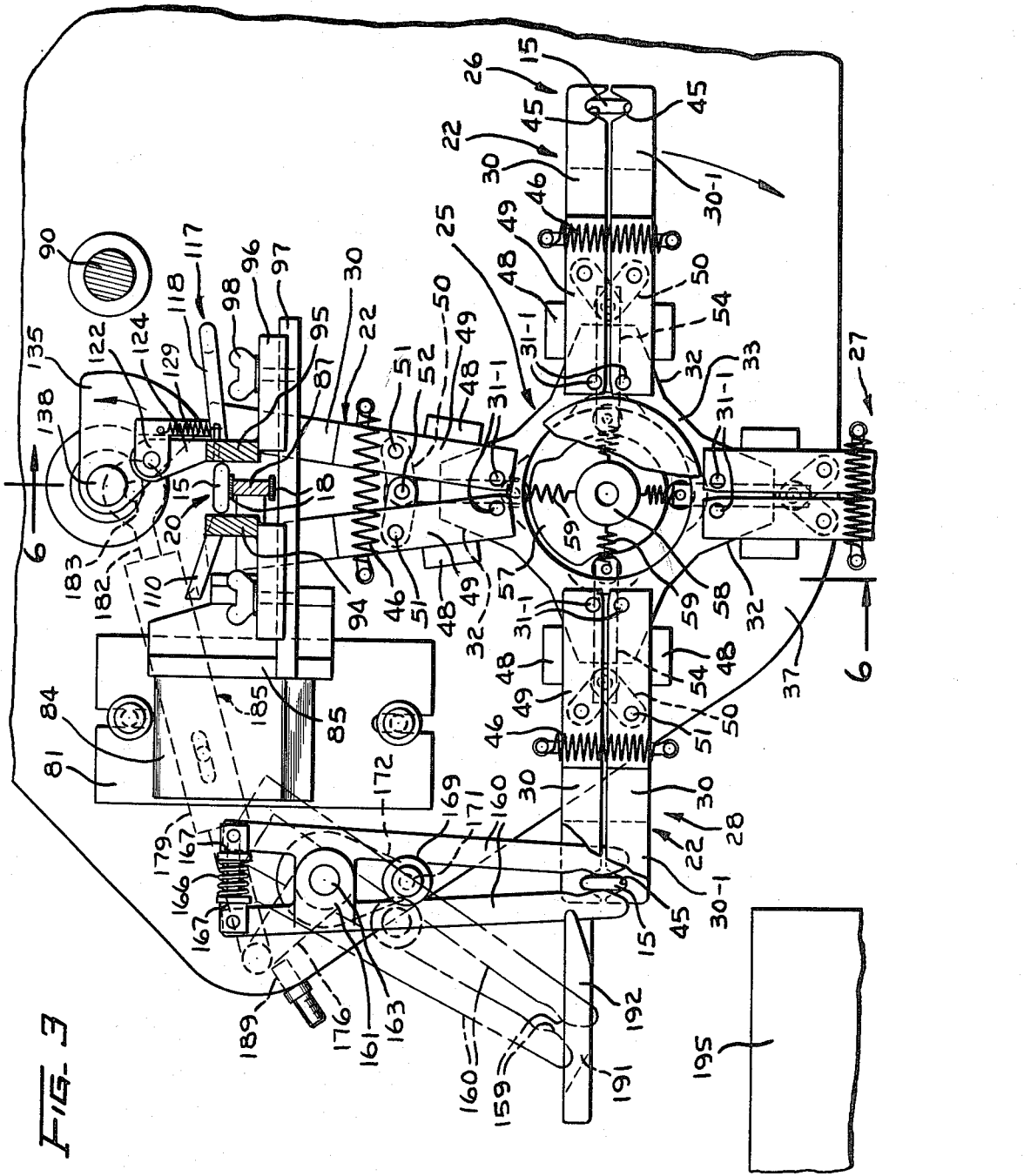

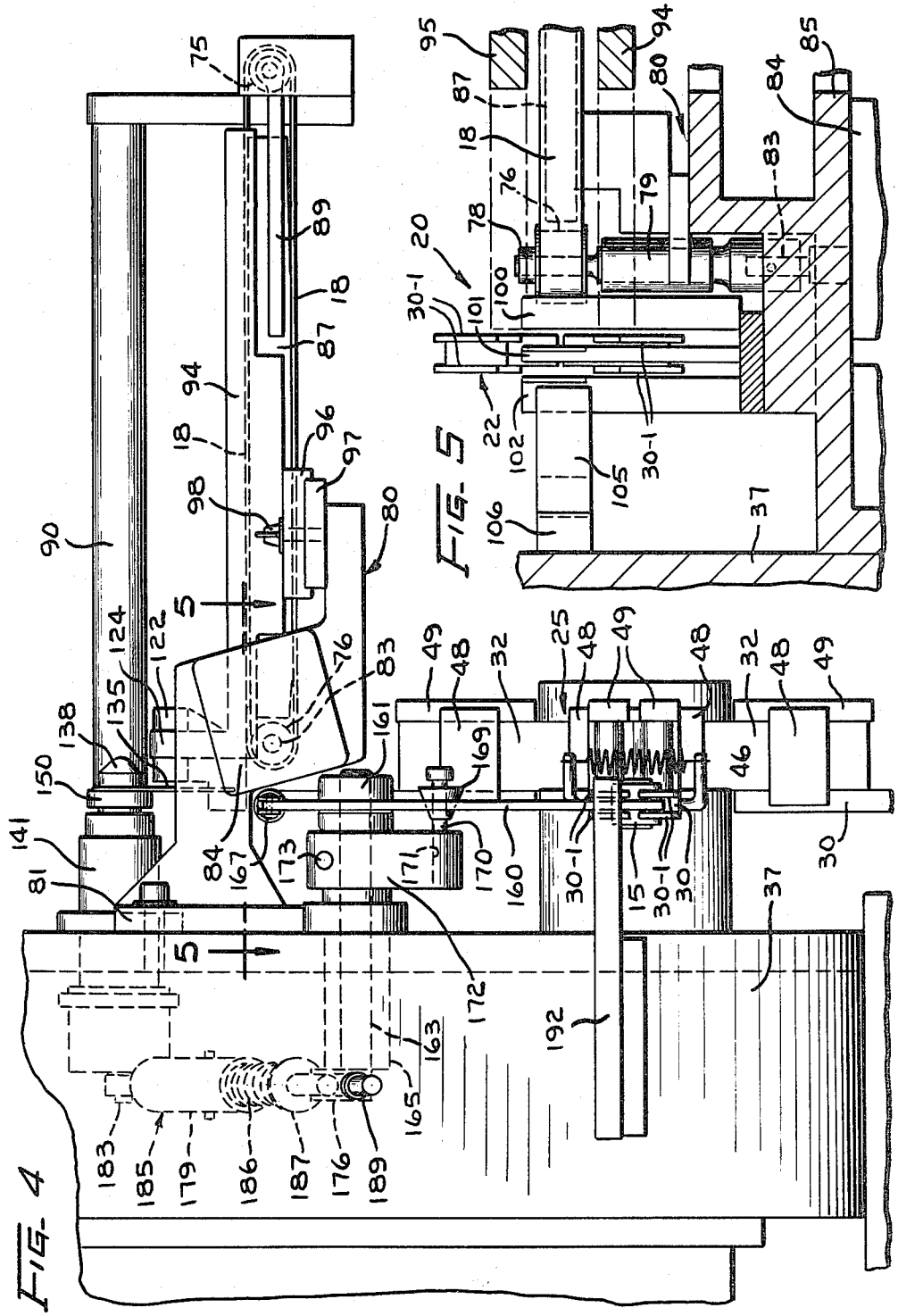

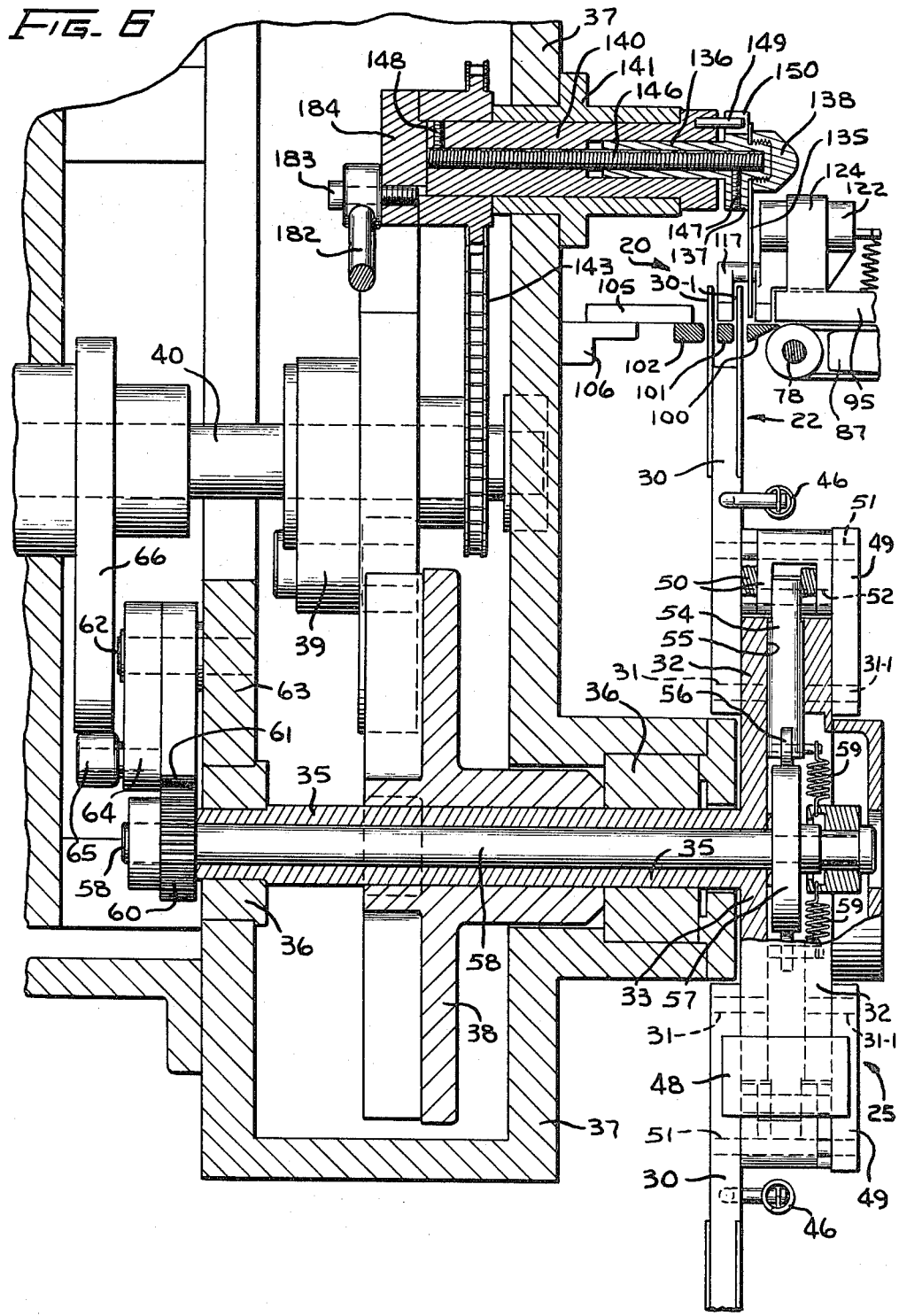

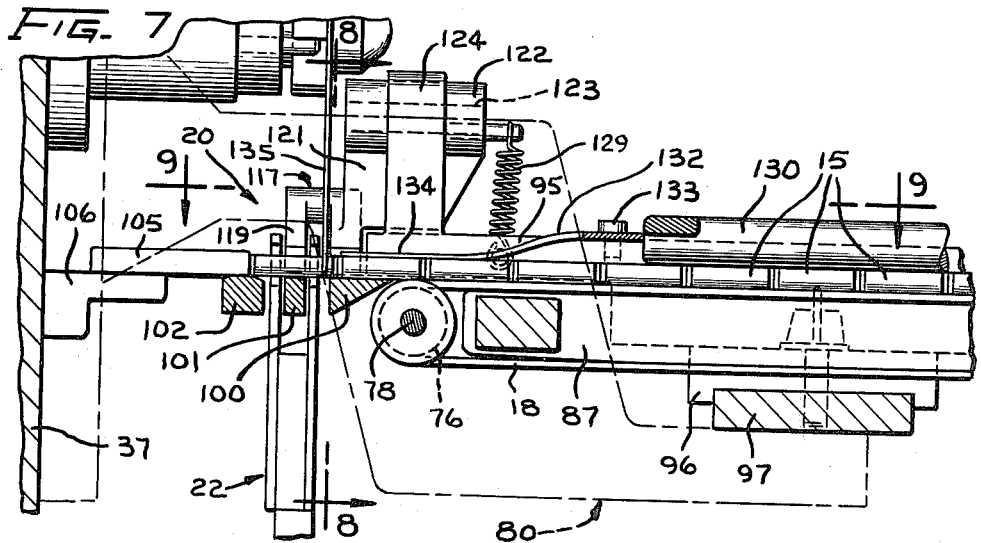
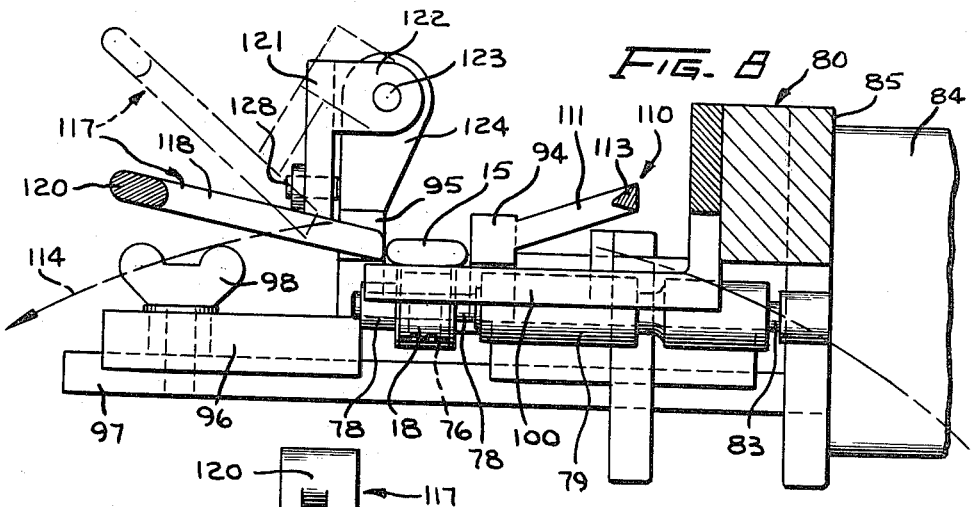
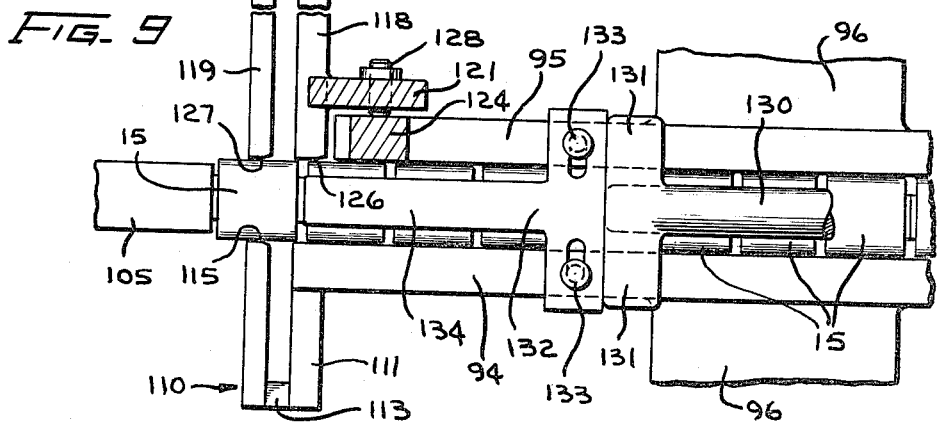

United States Patent Office

3,175,673
Patented Mar. 30, 1965

3,175,673
ARTICLE HANDLING AND ADVANCING
MECHANISM
Lawrence R. Hagner, Downers Grove, and Gustav O. Stegner, Naperville, Ill., assignors to Western Electric Company, Incorporated, New York, N.Y., a corporation of New York
Filed May 28, 1963, Ser. No. 283,917
9 Claims. (Cl. 198—25)

This invention relates to article handling mechanism, and more particularly to a mechanism for handling and intermittently advancing electrical components to a plurality of stations.

In the art of fabricating electrical components such as capacitors difficulty has been experienced in obtaining or devising mechanisms for efficiently and effectively handling successive components and advancing them to a plurality of stations for the performance of various operations thereon.

An object of the present invention is to provide an efficient and effective article handling mechanism.

Another object of the invention is the provision of an improved mechanism for handling articles and advancing them intermittently to a plurality of work stations.

A mechanism illustrating certain aspects of the invention may include an indexible rotary carrier having a plurality of holders each comprising a pair of pivoted arms which have opposed seats for supporting a capacitor therein and which are spring biased to closed position and cam actuated to open position. At a loading station a continuously driven belt advances a row of the articles and cooperates with side rails and stationary supports to feed the foremost article into a loading position to be gripped by the holder at the station as it is actuated to closed position. An end portion of one of the rails is pivotally and yieldably supported for movement laterally of the belt by the leading article as the latter is carried from the loading station. A rotary sector-shaped holdback plate moves into engagement with the leading article and as the article leaves the loading station the holdback plate moves into the path of the following article to prevent the movement of the following article into loading position until the folowing holder is in position to receive it.

At an unloading station, a pair of pivoted fingers, biased to a closed position, is mounted in the path of movement of the article for receiving and gripping the capacitor therebetween as the holder arrives at this station. After the holder is opened, the gripping fingers are actuated to carry the capacitor from the holder and against an inclined member which strips the capacitor from the fingers.

Other objects, advantages and novel aspects of the invention will become apparent upon consideration of the following detailed description, in conjunction with the accompanying drawings, in which:

FIG. 1 is a fragmentary plan sectional view of the article handling mechanism;

FIG. 2 is a fragmentary vertical cross-sectional view of the mechanism taken on line 2—2 of FIG. 1;

FIG. 3 is a front elevational sectional view of the mechanism taken on the line 3—3 of FIG. 1;

FIG. 4 is a fragmentary side view of the feeding mechanism as viewed from the left side of FIG. 1;

FIG. 5 is an enlarged fragmentary plan view of the mechanism taken on line 5—5 of FIG. 4;

FIG. 6 is a fragmentary vertical longitudinal sectional view of the mechanism taken on line 6—6 of FIG. 3;

FIG. 7 is an enlarged fragmentary vertical longitudinal sectional view through the mechanism at the loading station thereof taken on the line 7—7 of FIG. 1;

FIG. 8 is an enlarged fragmentary cross-sectional view of the mechanism taken on the line 8—8 of FIG. 7 and looking in the opposite direction from that of FIG. 3; and FIG. 9 is an enlarged fragmentary cross-sectional view of the mechanism taken on line 9—9 of FIG. 7.

In the present mechanism, articles 15 (FIGS. 1, 3, 7) in the form of capacitor bodies are deposited on an endless substantially horizontally disposed conveyor belt 18 (FIGS. 3, 7) by a suitable device (not shown) and are advanced by the conveyor in end to end engagement with one another to a loading station 20 (FIG. 3) where the leading article is gripped by one of a plurality of holders 22 of a rotary carrier 25. The carrier is mounted for clockwise rotation, as viewed in FIG. 3, about a horizontal axis and is intermittently actuated to advance the article to an intermediate station 26 at which the article is centered on the holder 22, to a station 27 at which leads are attached to the article, and to an unloading station 28 at which the article 15 is removed from the holder 22.

Each of the holders 22 comprises a pair of arms or jaws 30 which are pivotally supported at one end on pins 31 secured to radially extending portions 32 of a hollow hub 33 of the carrier 25. The hub 33 is formed on one end of a hollow shaft 35 (FIG. 6) which is rotatably supported in suitable bearings 36 in a stationary frame or housing 37. Intermittent movement is imparted to the shaft 35 and the carrier 25 to index the holders 22 to successive stations by a Geneva drive including a slotted wheel 38 secured to the hollow shaft 35 and cooperating with a Geneva actuating arm 39 secured to a drive shaft 40. The drive shaft 40 is rotatably supported in the frame 37 and is connected through worm gearing 41 (FIG. 1) and a shaft to a motor 42 for rotation thereby.

As shown in FIG. 6, the outer ends of the arms 30 of the holders 22 are bifurcated to provide a pair of flat article gripping portions or furcations 30–1. Viewed from the front (FIG. 3) the furcations 30–1 are provided with opposed recesses forming seats 45 engageable with opposite edge portions of the article 15 at longitudinally spaced portions thereof for gripping and accurately positioning the article therein when the arms 30 are in their closed position. A tension spring 46 interconnects the arms 30 of each of the holders 22 and urges them to the closed position.

Returning to FIG. 6, it will be seen that the arms 30 are supported on the back side of the hub portions 32 facing the frame 37 and have tie members 48 extending therefrom on opposite sides of the hub portions 32 parallel to the hollow shaft 35. The tie members 48 are secured to arms 49 which are disposed on the front side of the hub in opposed relation to the arms 30. The arms 49 which are relatively short are pivotally supported on pins 31–1 secured to the hub portions 32 in coaxial relation to the pins 31.

A pair of toggle links 50 are supported at their outer ends on pins 51 which extend between the arms 30 and 49 at a position intermediate the ends of the former. The inner ends of the toggle links 50 are interconnected to each other by a pin 52 and to one end of a plunger 54 which is mounted in a bore 55 in the hub portion 32 for sliding movement radially of the axis of the carrier 25. At its inner end the plunger 54 has a cam follower 56 which rides on a cam 57 (FIGS. 3 and 6) that is secured to one end of a shaft 58 extending through and suitably supported in the hollow shaft 35. The cam 57 is so shaped and actuated by suitable mechanism to impart movement to the actuating plungers 54 and the toggle links 50 to effect the selective opening and closing of the arms 30 of the holders 22 at the loading and the unloading stations 20 and 28, respectively. Springs 59 (FIGS. 3 and 6) urge the plungers 54 radially inwardly into engagement with the cam 57.

Secured to the end of the shaft 58 is a gear 60 which meshes with a gear sector 61 (FIGS. 1, 2 and 6). The gear sector 61 is pivotally supported on a stub shaft 62 which is fixedly secured to a member 63 of the frame 37. A lever 64 secured to the gear sector 61 has a cam follower 65 that rides on a cam 66 on the drive shaft 40. In cooperation with a spring 67 (FIG. 2) for returning the lever 64, the cam 66 serves to selectively open the holder 22 at the unloading station 28, to maintain the holder open as it moves to the loading station 20 and to selectively close the holder 22 after an article 15 has been fed thereinto at the loading station.

Referring now to FIGS. 1, 3–7, the conveyor belt 18 for advancing a row of the articles to the loading station 20 is supported at one end by an idler pulley 75 and at the other end by a driven pulley 76 which is secured to the reduced end of a shaft 78. This shaft is supported in a bearing 79 formed on a composite bracket 80, a portion 81 of which abuts the frame 37 (FIGS. 1 and 4) and is secured thereto. The other end of the shaft 78 is secured to a shaft 83 (FIG. 5) of a motor 84 that is supported on the vertically disposed wall portion 85 of the bracket 80 for continuously rotating the drive pulley 76 and advancing the conveyor belt 18. An elongated bar 87, secured at one end to the bracket 80, extends lengthwise of the conveyor belt and supports the upper flight thereof. A pair of brackets 89 (FIG. 4) are adjustably mounted on the bar 87 for supporting the idler pulley 75. Additional support for the end of the conveyor is provided in the form of a bracket 90 which is secured to the frame 37.

To confine the row of articles 15 on the conveyor belt 18 against lateral displacement, a pair of side rails 94 and 95 are disposed on opposite sides of the upper flight of the conveyor belt. The guide rails have laterally disposed mounting lugs 96 (FIGS. 1, 3 and 7) which are supported on a bar 97 for adjustable movement transversely of the conveyor and are locked in adjusted position by screws 98. The bar 97 extends laterally from the supporting bracket 80 and forms a part thereof.

As shown particularly in FIGS. 5 and 7, the delivery end of the conveyor belt 18 is positioned in horizontally spaced relation to the holder 22 at the loading station 20. To support the articles 15 for movement from the conveyor belt 18 into a loading position in alignment with the holder 22, a plurality of three supporting members or fingers 100, 101 and 102 are provided which extend from the support bracket 80 and form a part thereof. The three supporting fingers 100–102 are positioned in laterally spaced relation to each other to provide clearance for the spaced furcations 30–1 of the arms 30 of the holders 22 in the loading station and for movement of the furcations 30–1 into and from the loading station. An adjustable stop member 105 (FIG. 7) is secured to a bracket 106 on the frame 37 in the path of movement of the row of articles 15 to arrest the movement thereof and to position the leading article in a predetermined loading position in alignment with the open arms 30 of the holder 22.

To aid in guiding the leading article 15 into the loading station and to hold it against lateral movement, the end portions of the guide rails 94 and 95 are modified as shown in FIGS. 7–9. The end of the rail 94 terminates in vertical alignment with the space between the fixed supporting fingers 100 and 101 and has a U-shaped guide member 110 extending obliquely and laterally therefrom. The U-shaped guide member 110 has a pair of parallel arms 111 and 112 connected together at their outer ends by a portion 113 which is disposed beyond the arcuate movement of the holders 22 of the carrier 25 as indicated by the dot and dashed line 114 in FIG. 8. The end surface 115 of the inner portion of the arm 112 is disposed in longitudinal alignment with the inner surface of the guide rail 94 and is positioned adjacent the path of travel of the leading article 15 to support it against lateral displacement in one direction at the loading station.

The guide rail 95 is also provided with a U-shaped auxiliary guide member 117 for guiding the leading article 15 into loading position in the loading station and for preventing lateral displacement thereof in one direction, the auxiliary guide member being yieldably mounted for pivotal movement to permit the movement of the article 15 transversely of the conveyor belt 18 as the article is carried by the holder 22 from the loading station. The U-shaped auxiliary guide member 117 comprises a pair of obliquely disposed parallel arms 118 and 119 connected together at their outer ends by a transverse portion 120 which is disposed beyond the path of arcuate movement of the holders 22. A hinge plate portion 121 extending upwardly from the arm 118 has a pair of laterally disposed lugs 122 which are pivotally supported on a pin 123 that is secured to a lug 124 extending upwardly from the end of the guide rail 95. End surfaces 126 and 127 on the end portions of the arms 118 and 119 are aligned with the inner vertical guide surface of the guide rail 95 and serve to accurately position the leading or endmost capacitor in the loading station.

The pivoted auxiliary guide member 117 returns by gravity to its normal operative position in which it is stopped by the engagement of a screw 128 on the hinge plate 121 with the lug 124. A spring 129 connected at one end to the hinge plate 121 and at the other end of the rail 95 serves to insure the return of the auxiliary guide unit 117 to its normal operative position. It will be understood that as the carrier 25 is indexed and the holder 30 moves the article 15 from the loading station 20, the article 15 will cause the auxiliary guide member 117 to pivot about the pin 123 and be raised to an elevation at which the article 15 may pass beneath it, after which the auxiliary guide 117 returns to its normal position.

In order to prevent any upward buckling of the row of articles 15 on the conveyor belt 18 and in order to achieve a more efficient frictional driving engagement of the articles with the conveyor belt, a removable weighted hold-down member 130 (FIGS. 7 and 9) in the form of a rod is placed on the row of articles between the guide rails 94, 95. At the ends thereof the hold-down member 130 has a pair of laterally disposed ears 131 which are adapted to engage the guide rails 94, 95 and be supported thereby in the event that no articles 15 are present on the conveyor belt. A flat T-shaped hold-down member 132 is also provided which has laterally disposed arms that are secured to the guide rails 94, 95 by screws 133. The stem portion 134 of the hold-down member 132 forms a leaf spring which is positioned to engage several of the articles adjacent the leading article in the row and restrain them from upward displacement. The hold-down member 132 engages the end portion of the hold-down member 130 and serves to hold it against longitudinal movement with the row of articles.

Hold-back mechanism including a hold-back plate 135 (FIGS. 3 and 6) operates in response to the movement of the holder 22 and the article 15 from the loading station 20 to intercept and hold back the row of articles 15 until the following holder 22 is indexed to the loading station for the reception of the following article. The hold-back plate 135 is sector-shaped and has an apertured end which fits over a threaded end of a sleeve 136 and is clamped against an enlarged shoulder portion 137 of the sleeve by a nut 138. The sleeve 136 is rotatably supported in a hollow shaft 140 that is journalled in a bearing 141 on the frame 37 and is connected through a sprocket and chain connection 143 to the drive shaft 40 and is continuously rotated thereby.

Yieldably connecting the sleeve 136 to the hollow shaft 140 for rotation therewith is an axially disposed helical torsion spring 146 which is secured at one end to the sleeve 136 by a set screw 147 and is secured at its other end to the hollow shaft 140 by a set screw 148. The torsion spring 146 stresses the hold-back plate for rotation relative to the hollow shaft 140 in a counterclockwise direction as viewed in FIG. 3, the extent of relative rotation between the sleeve 136 and the hollow shaft 140 being limited by a pin 149 which extends from the hollow shaft 140 into a slot 150 in the shoulder portion 137 of the sleeve 136.

The hollow shaft 140 is rotated through one revolution for each indexing movement of the carrier 25 and moves the hold-back plate 135 into engagement with the article 15 at the loading station 20 slightly prior to the indexing movement of the carrier. The torsion spring 146 winds up slightly and permits the arresting of rotation of the hold-back plate 135 for a short interval of time until the carrier 25 is indexed. As the carrier is indexed and the article is moved from the loading position, the hold-back plate 135 advances with the article 15 and moves into the path of the following article of the row of articles on the conveyor belt 18 and arrests the movement thereof. The width of the hold-back plate 135 and the movement thereof is such that the plate 135 will hold back the row of articles 15 until the indexing movement of the carrier 25 has been completed and the following holder 22 has arrived in its open position at the loading station 20 in position to receive the following article. As the plate 135 moves out of the path of the row of articles, the conveyor belt advances the row of articles and moves the leading article 15 into the loading position on the supporting members 100–102 and against the stop 105 and in alignment with the holder 22.

After leads have been attached to a capacitor or article 15 at the station 27, the carrier 25 is indexed and the article is carried by the holder 22 to the unloading station 28 and into engagement with and between the lower ends 159 of a pair of vertically disposed transfer fingers 160 (FIG. 3) which are located to fit between the furcations 30–1 of the arms 30 of the holder (FIG. 4). Each of the fingers 160 intermediate its ends has an apertured hub 161 that is supported on an end portion of a horizontally disposed shaft 136 which is journalled for oscillatory movement in a bearing 165 on the frame 37 (FIGS. 1 and 4). The upper ends of the fingers are urged apart by a compression spring 166 and spring supporting members 167 connected to the fingers at the upper ends thereof to urge the lower portions of the fingers toward each other into engagement with a conical stop member 169 (FIG. 4).

The conical member 169 is mounted on a rod 170 that is threaded and adjustably supported in a threaded aperture 171 in the lower end of an arm 172. The upper apertured end of the arm 172 is split and clamped to the shaft 163 by a screw 173 for oscillatory movement therewith. The threaded rod 170 is adjusted to locate the conical member 169 in a position to stop the transfer fingers 160 with the article gripping surfaces of the lower ends 159 thereof spaced apart a distance slightly less than the thickness of the article 15. The lower ends 159 of the transfer fingers 160 are provided with inclined surfaces for guiding the article 15 between the fingers which then serve to yieldably hold the article after the arms 30 of the holder 22 are actuated to open position.

Drive mechanism including a lever arm 176 secured to the shaft 163 is provided for rocking the shaft 163 and the transfer fingers 160 to and from an article receiving position shown in full lines in FIG. 3. At one end thereof the lever arm 176 for rocking the shaft 163 is pivotally connected to one end of a rod 178 (FIG. 1), a portion of which is slidably disposed in a sleeve 179 and connected thereto for movement therewith and for limited longitudinal movement relative thereto by a pin 180 on the rod and a slot 181 in the sleeve. At the opposite end of the sleeve is a member 182 (FIG. 6) that is pivotally connected to a crank pin 183 of a crank disc 184 which is secured to the hollow shaft 140 for rotation therewith. The rod 178 and sleeve 179 which form a resilient or yieldable link 185 interconnecting the crank pin 183 and the lever arm 176 are stressed for movement away from each other to a normal extended condition by a spring 186 interposed between the end of the sleeve 179 and a collar 187 on the rod 178.

The arrangement of the crank and the resilient link 185 is such that during each revolution of the crank 183, the lever arm 176 will be moved into engagement with a stop screw 189 on the frame 37 and will be held there for a predetermined period of time with the transfer arms in the normal vertical position as shown in full lines in FIG. 3 while the link 185 is shortened from and returned to its normal condition, after which the continued rotation of the crank imparts oscillatory movement to the shaft 163 and the transfer fingers 160 to the dotted line position and back again. It will be understood that it is only after the holder 22 in the unloading station 28 has been actuated to open position that the transfer fingers 160 with the article 15 gripped therebetween are moved from the full line position and carry the article therewith, during which movement the transfer fingers 160 pass through a slot 191 in a fixed horizontal stripper plate 192 to effect the stripping of the article 15 from the fingers 160. A suitable receptacle 195 is provided for receiving the articles. The stripper plate 192 is suitably supported to the frame 37.

*Operation*

In the operation of the article handling apparatus, the articles 15 are fed manually or by a vibratory orienting and feeding device (not shown) onto the conveyor belt 18 and the articles which form a row in abutting relation to one another are advanced by the conveyor toward the loading station 20. The leading article 15 as it leaves the conveyor belt is pushed by the row of articles therebehind onto the supporting elements 100–102 into a loading position between the open arms 30 of a holder 22 at the loading station, and the article is arrested in a loading position in alignment with the holder 22 by engagement with the stop 105. The rotating hold-back plate 135 moves into engagement with the leading article as the arms 30 of the holder 22 are actuated under control of the cam 57 to closed position to grip the article 15 and as the carrier 25 is indexed to carry the article from the loading station 20 to the station 26.

As the article 15 is moved by the holder 22 from the loading station 20, the article engages the movable guide member 117 and rocks it about the pivot 123 to an elevation providing clearance for the movement of the article 15 therebeneath, after which the movable guide member 117 is returned by gravity and the spring 129 to the normal position. Also during this movement of the article 15 from the loading station 20 the hold-back plate 135 advances therewith and moves into the path of movement of the following article 15 on the conveyor belt 18 and serves to arrest the advancing movement of the row of articles for a predetermined time sufficient to allow the movement of the following holder 22 to the loading station 20 with the arms 30 of the holder 22 in open condition for the reception of the following article 15. After this the hold-back plate 135 moves out of the path of the row of articles 15 and permits the movement of the leading article 15 into loading position.

As the carrier 25 is indexed successively, the holders 22 are advanced to the several stations. As the holder 22 moves into the unloading station 28, an article 15 is carried thereby between the lower ends 159 of the transfer fingers 160 and is gripped thereby. The holder actuating cam 57 is then actuated in a counterclockwise direction as viewed in FIG. 3 to effect the opening of the holder 22 and the release of the article 15 at the unloading station. Thereafter, the gripping fingers 160 are oscillated to the dotted line position to effect the stripping of the article 15 from the fingers 160 by the plate 192.

During the following indexing movement of the carrier 25 the cam 57 operates to maintain the holder 22 in open position as it moves from the unloading position 28 to the loading position 20. The stripping fingers 160 are returned to their normal vertical article receiving position prior to the movement of the following holder 22 to the unloading station 28. Upon completion of the indexing movement of the carrier 25, the holder operating cam 57 is actuated one step in the counterclockwise direction under control of cam 66 to effect the movement of the holder 22 to open position at the unloading station 28 while maintaining the holder 22 at the loading station in open position. After an article 15 has been fed into the loading position at the loading station 20, the cam 57 is actuated a second step in the counterclockwise direction under control of cam 66 to effect the closing of the holder 22 at the loading station 20 preparatory to the indexing of the carrier 25 and the next cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an article handling mechanism:
a carrier mounted for rotation about an axis;
a plurality of article holders mounted on said carrier, each of said holders including a pair of arms each of which is pivotally connected at one end to the carrier and has a seat for receiving the article, spring means for urging said arms into normally closed positions to support an article in said seats, and a toggle for moving said arms to open position;
means for intermittently actuating said carrier to advance said holders to a plurality of stations including a loading station and an unloading station;
a cam mounted for turning movement about said axis for actuating said toggles to effect the movement of said holders to open position; and
means for oscillating said cam to effect the selective opening and closing of said holders at said loading and said unloading stations.

2. In an apparatus of the type described,
a carrier mounted for rotation about a first axis;
a plurality of article holders mounted on said carrier for movement therewith and for movement to open and closed positions;
means for intermittently indexing said carrier to advance successive holders to a loading station;
means for selectively opening and closing said holders;
conveyor means at the loading station for advancing a row of articles transversely to the path of movement of said holders and moving the leading article thereof to a loading position to be gripped by an open holder at the loading station;
a hold-back plate mounted for rotation about a second axis disposed above and parallel to said first axis into engagement with the leading article at the loading station;
a drive element mounted for rotation on said second axis;
means yieldably connecting said hold-back plate to said drive element for rotation therewith and for limited rotary movement relative thereto; and
means for rotating said drive element in timed relation to the indexing of said carrier to effect the rotation of the hold-back plate into engagement with the leading article at the loading station and for limited movement with such article and into the path of the following article to arrest the movement of the latter until the following holder has been advanced to the loading station for receiving such article.

3. In an article handling device:
a carrier mounted for movement along a predetermined path;
article holders on said carrier each comprising a pair of relatively movable arms provided with seats for receiving and supporting an article therein;
means for indexing said carrier to advance successive holders to a loading station;
means for selectively actuating said holders to open and closed positions at said loading station;
means including an endless conveyor supported at the loading station for advancing a row of articles toward said holder at the loading station in a direction transversely of the path of movement of said holders;
a first guide rail for said conveyor disposed on one side of said row of articles and having an end portion disposed on one side of the leading article at the loading station and provided with a slot for movement of the holder therethrough;
a second guide rail for said conveyor on the other side of the row of articles for guiding the articles to the loading station;
an auxiliary guide member; and
means for pivotally mounting said auxiliary guide member for movement to a normal position adjacent to said second guide member and on the other side of the leading article and for movement laterally away from said conveyor by the leading article in response to movement of the latter from the loading station, said auxiliary guide member having a slot for movement of said holders therethrough.

4. In an article handling device:
a carrier mounted for rotation about a horizontal axis;
a plurality of article holders mounted on said carrier and movable to open and to closed positions, each of said holders including a pair of relatively movable arms each of which has a bifurcated end with the furcations thereof provided with recessed seats engageable with spaced portions of an article;
means for intermittently actuating said carrier to advance said holders to a plurality of stations including a loading station;
means for selectively actuating said holders to open and to closed positions;
means at said loading station including a plurality of spaced supporting elements for supporting an article in a loading position in the path of movement of said holders and between the open arms of a holder at the loading station and providing clearance for movement of the bifurcated ends of said holders therethrough;
conveyor means for advancing a row of the articles to the loading station and for effecting the pushing of the leading article into the loading position on said article supporting means;
a first guide rail for said conveyor on one side of said row of articles and having an end portion disposed on one side of the leading article at the loading position and provided with slots for movement of said bifurcated ends of said holders therethrough;
a second guide rail for said conveyor on the other side of the row of articles for guiding the articles to the loading station;
an auxiliary guide member disposed adjacent said second guide member and on the other side of the leading article for guiding the leading article into the loading position and provided with slots for movement of said bifurcated ends of the holder therethrough;
means for mounting said auxiliary guide member for movement to a normal position adjacent the leading article and for movement from the normal position by the leading article in response to movement of such article from said loading station; and means for returning said auxiliary guide member to said normal position.

5. In an article handling mechanism:
a carrier mounted for rotation about an axis;
a plurality of article holders mounted on said carrier and moveable to open and closed positions, each of said holders comprising a pair of relatively moveable arms each of which has a bifurcated end with the furcations thereof provided with recessed seats engageable with spaced portions of an article;
means for itermittently actuating said carrier to advance successive holders to a loading station;
means including a cam mounted for turning movement about said axis for effecting the selective actuation of said holders to open and closed positions;
mean mounted in the path of movement of said holders for supporting an article in a loading position between the open arms of one of said holders at the loading station;
means at said loading station for advancing a row of the articles to said loading station and for moving the leading article into a loading position onto said article supporting means;
a hold-back plate mounted for rotation into engagement with the leading article in said loading position; and
means for rotating said hold-back plate in timed relation to the actuation of said carrier to effect a limited movement of said plate with said article and into the path of movement of the following article to arrest the movement of such following article until the following holder on said carrier has been moved to the loading station.

6. In an article handling mechanism:
a carrier mounted for rotation about a horizontal first axis;
a plurality of article holders mounted on said carrier and movable to open and closed positions, each of said holders comprising a pair of relatively movable arms each of which has a bifurcated end with the furcations thereof provided with recessed seats engageable with spaced portions of an article;
means for intermittently actuating said carrier to advance said holders to a loading station;
means including a cam mounted for turning movement about said first axis for effecting the actuation of said holders to open and to closed positions;
means including a plurality of spaced elements for supporting an article in the path of movement of said holders and in a loading position between the open arms of a holder at the loading station and providing clearance for movement of the bifurcated ends of said holders between said elements;
a belt conveyor for advancing a row of the articles to the loading station and the movement of the leading article into the loading position on said article supporting means;
means for continuously actuating said conveyor;
a hold-back plate mounted for rotation about a second axis disposed above and parallel to said first axis into engagement with the leading article at the loading station;
a drive element mounted for rotation about said second axis;
means yieldably connecting said hold-back plate to said drive element for rotation therewith and for limited rotary movement relative thereto; and
means for continuously rotating said drive element in timed relation to the movement of said carrier to effect the rotation of the hold-back plate into engagement with the leading article at the loading station and for limited movement with such article and into the path of the following article to arrest the movement of the latter until the following holder of said carrier has been advanced to the loading station for receiving such article.

7. In an article handling mechanism:
a carrier mounted for rotation about a horizontal axis;
a plurality of article holders mounted on said carrier and movable to open and closed positions, each of said holders comprising a pair of relatively movable arms each of which has a bifurcated end with the furcations thereof provided with recessed seats engageable with spaced portions of an article;
means for intermittently moving said carrier to advance successive holders to a plurality of stations including a loading station and an unloading station;
a cam mounted for turning movement about said axis for effecting the actuation of said holders to open and to closed positions;
means for oscillating said cam between successive increments of movement of said carrier to effect the actuation of said holder to open position after said holder arrives at said unloading station and to maintain said holder open as it moves to the loading station and for effecting the actuation of said holder to closed position at said loading station to grip an article;
means at said unloading station for engaging and frictionally gripping the article in a region disposed between the furcations of said holder as said holder moves into said unloading station;
means for actuating said gripping means after said holder has been actuated to open position to remove the article from said holder;
fixed article supporting means at said loading station mounted in the path of movement of said holders for supporting an article in a loading position between the open arms of said holder at the loading station;
means at said loading station for advancing a row of the articles to said loading station and moving the leading article into a loading position onto said article supporting means;
a hold-back plate mounted for rotation into engagement with the leading article in said loading position; and
means for rotating said hold-back plate in timed relation to the movement of said carrier to effect a limited movement of said plate with said article and into the path of the following article to arrest the movement of such following article until the following holder on said carrier has been moved to said loading station.

8. In an article handling mechanism:
a carrier having article holders thereon movable to closed and open positions respectively for holding and releasing articles;
means for intermittently moving said carrier to advance the holders successively to an unloading station;
means for selectively actuating said holders to open and to closed positions between increments of advancing movement;
a pair of gripping elements pivotally mounted at the unloading station for receiving and releasably supporting an article therebetween;
a crank;
means including a resilient link interconnecting said crank and said gripping elements for effecting the oscillation of said gripping elements along a predetermined path and the removal of an article from said holder in response to rotation of said crank;
means for rotating said crank in timed relation to the movement of said carrier; and
means for stopping said gripping elements during a portion of each rotation of said crank to arrest the movement of said gripping elements in a receiving position at the unloading station for receiving an article as it is moved to the unloading station by one of said holders.

9. In an article handling mechanism:
a carrier mounted for rotary movement about an axis and having article holders thereon movable to closed and open positions;

means for indexing said carrier to advance the holders successively into an unloading station;

means operable in timed relation to the indexing of said carrier for actuating said holders to open and closed positions;

a pair of gripping fingers pivotally mounted at the unloading station for receiving and releasably supporting an article therebetween;

a crank;

means including a resilient link between said crank and said gripping fingers for effecting the oscillation of the fingers along a predetermined path and the removal of an article from said holder in response to rotation of said crank;

means for rotating said crank in timed relation to the indexing of said carrier;

means for stopping said gripping fingers during a portion of each rotation of said crank to arrest the movement of said gripping fingers in a receiving position at the unloading station for receiving an article as it is moved to the unloading station by one of said holders; and means responsive to the movement of said gripping fingers from said receiving position and said holder for effecting the removal of the article from said gripping fingers.

References Cited by the Examiner
UNITED STATES PATENTS

| | | | |
|---|---|---|---|
| 2,904,161 | 9/59 | Schreiber | 198—25 |
| 3,043,447 | 7/62 | Lauck et al. | 198—210 X |
| 3,124,232 | 3/64 | Humen | 198—25 |

SAMUEL F. COLEMAN, *Acting Primary Examiner.*

WILLIAM B. LA BORDE, *Examiner.*